Patented July 4, 1939

2,165,154

UNITED STATES PATENT OFFICE 2,165,154

BAKING GREASING METHOD AND PRODUCT

Iva de Freese Savage, Jersey City, N. J.

No Drawing. Application June 10, 1936,
Serial No. 84,460

22 Claims. (Cl. 99—90)

This discovery relates to baking greasing methods and products. More particularly it relates to the application at the crust contacting surface of baking devices of a firm film of fatty solids, which resists displacement and water phase wetting of the devices having indirect contact with the raw baking mix, with the result that removing the finished baked goods is facilitated and more perfect molding results obtained.

Methods and fats are to be described for preventing the bonding phase components in batters, doughs or compositions of shortening, sugar, flour, water and the like, from forming strongly attached adhesions with device materials, such as aluminum, Allegheny metal, steel, tin, glass, china, earthenware, paper, wood, etc., constructed into devices to retain, contain, hold, mold, form, support, line or function with food compositions in baking operations.

Among the objects of this invention are to produce a permanent intermediate fatty film and lining phase between crust and pan. Lubricated slippage of the goods, permitting stainless uniform contraction and expansion with temperature and moisture changes, is among the advantages obtained. Dumping or removal of finished baked goods is facilitated. Uniform and unbroken crust surfaces are obtained, especially by cooling to sugar hardening temperatures before discharging from the baking devices.

When baking shortenings, such as natural lard or similar hydrogenated oils or fats, are used to grease baking devices, the water phase wets through the shortening-grease film, the denser gravity sugar solution sinking through the fatty fluid film. Cake baking devices with removable bottoms have come into extensive use, because greasing with fluid fats failed to facilitate removal and prevent crust to utensil bonding. Paper liners have come into use for similar reasons. The crust is fused to the liner instead of to the utensil. The liner is often removed by wetting and/or steaming in such products as macaroons but the cheaper type of cup cake is usually marketed paper cup attached to be removed by the consumer. The above means facilitate debonding of crust fusions and in no manner can they be classed as preventive methods.

I have found that by applying fats to baking devices and setting the grease film firmly by removing latent heat of fusion, the function of the grease can be made fully effectual in preventing crust fusions to baking devices. To do this with the shortening type of soft oily fats, freezing refrigeration temperatures have given favorable results. It has been found more practical to use fats of higher melting points, which are firm and solid at batter or dough temperatures. Hydrogenated fats and/or oils of very high melting point have been obtained on the market, such as Firmtex or dyrogenated peanut oil with a melting point of 140 deg. F. This fat has been used by itself and also compounded with cheaper lower melting point fats, such as Clix, an hydrogenated lard. It is not necessary to have more of the hard fat phase than will give a rapid set film under the cooling conditions provided in the bakery. Filbisk or hydrogenated coconut oil, melting point 110° F. has given good compounds with Firmtex.

The melting and solidifying points of fats are not the same. Pressed stearine melts around 132 deg. F. As cooled, it may reach 108 deg. F., before depositing its solids. Without pressing out the oil phase, the tallow would melt at around 110 deg. F., and remain translucent to about 90 deg. F. Fats refined by hydrogenation have been found to hold a satisfactory flavor and odor longer than those not so treated. It is believed that any of the animal or vegetable oils and/or fats can be utilized and be made into substantial equivalents of those above described, as they can all be reduced in temperature to the solid state and this temperature can be raised to any desired degree by hydrogenation.

I have also found that a pulverized filler can be compounded into greasing compositions to obtain stronger and suctionless set films. Flour and cocoa have been used. A vacuum force may exist with soft grease compounds and hold the baked goods to the baking device, even though there is no direct fused contact. Solids between the crust and metal provide an air space. The fat solids as well as the filler limit the film contraction forces and permits the flow of air under the cooling baked goods.

In offering any opinions as to the scientific aspects of this invention, it is to be understood that they are not given to limit its nature or scope. The problem of greasing baking utensils has been one of finding a means to prevent wetting the device with water prior to attaining baking temperatures. It would appear that the use of strong solid films has accomplished such results. The greasing phase does not become fluid until the greased device is hot. A hot oiled device is thus obtained. Water films do not spread on either a hot metal or a hot oiled one. The greasing film is not subject to displacement under the conditions here provided. The greater surface tension of water on metals can displace a fluid oil phase at low prebaking heats. Greasing films rigid enough to support the water and sugar load have been obtained with the types of fats described. Just how these fats continue to support the water and sugar load after being melted is of theoretical interest but of no great concern to the members of the baking art. A cushion of steam is said to exist between hot metals and the spherical water phase in contact therewith. Whether such a phenomenon exists on the baking device surfaces is not known. It may be that the vacuum suction forces are due to a steam layer condensation during cooling.

As an application of methods, old fashioned pound cake will be described. The ingredients are one pound each of butter, sugar, eggs and flour, to which one teaspoon of salt and one tablespoon of flavor are added. Any multiple of this unit batch may be used. Syrups such as rum, extracts such as almond, orange etc., are used for flavoring. The butter and sugar are mechanically stirred, the energy input supplying the heat to melt and cream the butter. The egg yolks are added and stirred into the mix. The flour is then sifted in and slowly dispersed. The whipped egg whites, salt and flavor are then folded into the composition.

The interior of the baking pan is greased with a composition of 40 parts Clix, 20 of Firmtex and 40 of flour. The melted fat is brushed on the hot pans, which are air cooled at about 75 deg. F. At about 112 deg. F. this composition deposits enough fatty solids to possess a plastic consistency. At normal bakery temperatures a firm set consistency is rapidly reached. By increasing the proportions of Firmtex, firm set ups can be obtained at abnormal atmospheric temperatures existing in poorly ventilated bakeries on the hottest summer days. When the greasing film feels dry to the touch, it is in suitable condition for charging the cake batter. The fat should not be cooled hard enough to crack, especially when used with flexible pans. The charged pans should be placed in an oven at baking heat without delay. When the baked cake is removed from the oven, they are not dumped from the pans until firm and strong. They may be removed while the pans are still warm enough to be wiped clean and regreased for reuse, washing the pans with soap and water not being necessary or best.

When crust shades of parched flours are used as fillers, very keen observation is necessary to see the greasing-flour phase on the surface of the molded crust. By the use of a fat solvent differences in hard fat content at the molded crust and in the interior of the cake are subject to observation and analysis.

Typical published prior art methods will be quoted as to baking pan treatment with old fashioned pound cake:

"Place in one or two ungreased oblong molds lined with wax paper, etc." Easy Baking, by Emily Riesenberg, page 136.

"Line a cake-tin with buttered paper, pour in the mixture, etc." Everyday Cake Book, by Mrs. G. Paul and Mrs. David Lloyd George, page 34.

"Bake in wood-lined pound-cake pans at 300 to 325 F." A Treatise on Cake Making, Standard Brands Incorporated, page 322–3. The greasing and lining of pans is more fully described in the above treatise, pages 119–121 and 1933 edition. The only specific grease described is "5 lbs. of shortening and 1 lb. of bread flour" on page 120 and line 18.

By the use of hard dry greasing fats, oily wet crusts are avoided, which is not possible with the soft plastic shortening types of fats, designed primarily for mechanically blending with sugar, flour and the like. The fluid fats are more subject to rancidity deterioration and baked goods made on pans greased with the shortening type of fats have inferior keeping qualities and flavors as compared to those herein described.

In making chocolate cakes, pulverized cocoa is used in the greasing compound to obtain crust color matching. Chocolate may be used, it being cocoa and cocoabutter. Pulverized yellow corn has been used for yellow shades. Rice flour has been found very translucent. The proportions of filler to fat are not critical and may be varied to suit the fancy of the operator. The viscosity of the melted fat is increased by adding filler and decreased by adding more fat to the greasing composition. The more fluid grease makes for a lighter coat. Heavy coats do not yield a greasy appearance and are more moisture proof against wetting with frostings or drying out when exposed to the air. Therefor it can be seen that the ideas and methods of applying soft lardy greases are not necessarily good practice with harder fats.

As another application of the method, one of a difficult type will be described, thin crisp cookies or molasses wafers. The several ingredients are:

| | Parts |
|---|---|
| Refined butter oil | 40 |
| Hydrogenated lard | 60 |
| Powdered brown sugar | 210 |
| West Indies molasses | 150 |
| Baking soda | 1 |
| Salt | 3 |
| Egg | 50 |
| Milk | 60 |
| Sifted flour | 250 |

The batter is made by creaming the fats and sugar, adding the egg as soon as the fat is soft enough to emulsify. The molasses, salt and soda are stirred well together and added. The flour is then added and mixed in. The viscosity is then adjusted with milk in about the proportions given. Additional flavors may be used, ginger producing ginger snaps. Substitute flavors such as butterscotch, maple, etc., may be used in the place of molasses.

This batter can not be rolled into sheets or subjected to embossing operations. Flour enough to absorb the liquid sugar phase and stiffen the mix would be required and a doughy-eating product would then result. Dough cookies do not give pan adhesion difficulties if they are dry enough, flour usually being added to make baking easy, as well as plastic for rolling.

Cookies and wafers of the wet syrup type as above illustrated are the preferred product. They are high priced and manufactured under difficulties because no really feasible way has hitherto been found of depositing cookie batter discs on pans at rates sufficient to feed conveyor ovens or to remove the baked product at such speeds. They have had to be cut loose one at a time before cooling to strong sugar adhesions to avoid breaking. Such cut-loose cookies are bent and torn. Their bottom crusts are not smooth and they do not pack well. A new method of producing this type of baked goods will now be described.

Alclad 18-gauge sheets are used as baking pans. Hydrogenated fats such as Firmtex, Clix, etc., in the greasing composition. Beef stearine may be used if the product is to be consumed in the immediate future. The sheets are placed on a water cooled rack to set the greasing composition at about 60 deg. F.

A 0.125-in. sheet of Thiokol oil-proof synthetic rubber, perforated with a plurality of 1.7-in. holes on 2.5-in-centers, is placed over the chilled dry-hard greased baking sheet. The batter is forced across the stencil with an enclined spreader carrying a mass wider than the stencil holes, filling them and removing the surplus. The stencil is lifted leaving the baking pan charged with cookie shaped batter deposits thereon. They are charged into an oven at 400 deg. F. The wafers expand laterally to about 2.5 inches in diameter and vertically to 0.16 inch in thickness. Thinner wafers can be made by the use of thinner Thiokol sheeting. The holes can be circular, lunar, oval, hearts, or of any design without limitation other than the tops must be flat.

The greasing phase remains sandwiched between the wafer and Alclad baking sheet. When the sheet cold, it is the only bonding material. The sheet is flexed and the cookies pop off without any breakage. They have a smooth glossy bottom crust, which is perfectly flat. The flour-fat greasing phase is more concentrated at the edges, it is plowed away by the expanding wafer during baking. Should wafers flow into one another, this outer grease rim prevents them from becoming attached to one another. Hexagon wafers are made by the use of thin batters having greater expansion than the stencil spacing provides for. Circular holes are the usual shapes and the holes are centered at 60 degrees, giving maximum coverage. Chopped nut meats can be added to the surface of the discs before removing the stencil. If solids are to be added to the mix, they must be cut to a diameter less than the stencil thickness or softened so as to be compressible within the stencil opening.

A brief description of the application of the method to fruit pies will be given. The crust ingredients are:

| | Volume |
|---|---|
| Hydrogenated lard | 1 |
| Flour | 2 |
| Water | ¼ |

The filler ingredients of apple pie are:

| | Volume |
|---|---|
| Apples | 6 |
| Sugar | 1 |
| Cinnamon | 0.01 |
| Nutmeg | 0.003 |
| Flour | 0.1 |

There is no sugar in the crust mix to cause crust fusion or pan adhesions. The latter results from foaming over and/or crust punctures, bringing the filler ingredients to the pie tin surface. Punctures can be avoided by piece by piece filler packing or by the use of very thick bottom crusts. Foaming over is remedied by partial filling leaving a foam expansion space. There is no poorer pastry than a thick crusted half empty pie.

The capillary force between the pie tin and pie crust of the normal pie is a water capillary, the tin being wet with a water film. The pie juice is sucked into this crevice at any puncture points or at the top rim foam zone. The juice boils to a strong fused bond, making the removal of the whole pie intact impossible.

Pie pans greased by the method with fat solids have been found to have an oil capillary and do not suck the sugared fruit juices into the crevice between the crust and pie tin. Thinner crusts and fuller fills can thus be obtained and removable pies, free from crust breakage, are obtained as well.

I claim:

1. The greasing method comprised of applying a fat to the crust contacting surface of a baking device and removing the latent heat of fusion sufficiently to set the greasing film.

2. The greasing method comprised of applying a melted fat to the crust contacting surface of a baking device and removing the latent heat of fusion sufficiently to set the greasing film.

3. The greasing method comprised of applying a melted fatty solid to the crust contacting surface of a baking device and removing the latent heat of fusion sufficiently to set the greasing film.

4. The greasing method comprised of applying a melted hydrogenated fatty solid to the crust contacting surface of a baking device and removing the latent heat of fusion sufficiently to set the greasing film.

5. The greasing method comprised of applying a fat and filler to the crust contacting surface of a baking device and removing the latent heat of fusion sufficiently to set the greasing film.

6. The greasing method comprised of applying a melted fat and filler to the crust contacting surface of a baking device and removing the latent heat of fusion sufficiently to set the greasing film.

7. The greasing method comprised of applying a melted fatty solid and filler to the crust contacting surface of a baking device and removing the latent heat of fusion sufficiently to set the greasing film.

8. The greasing method comprised of applying a melted hydrogenated fatty solid and filler to the crust contacting surface of a baking device and removing the latent heat of fusion sufficiently to set the greasing film.

9. The greasing method comprised of applying a fat and flour to the crust contacting surface of a baking device and removing the latent heat of fusion sufficiently to set the greasing film.

10. The greasing method comprised of applying a melted fat and flour to the crust contacting surface of a baking device and removing the latent heat of fusion sufficiently to set the greasing film.

11. The greasing method comprised of applying a melted fatty solid and flour to the crust contacting surface of a baking device and removing the latent heat of fusion sufficiently to set the greasing film.

12. The greasing method comprised of applying a melted hydrogenated fatty solid and flour to the crust contacting surface of a baking device and removing the latent heat of fusion sufficiently to set the greasing film.

13. The baking method comprised of applying a grease to the crust contacting surface of the utensil metal, removing the latent heat of fusion sufficiently to set the greasing film, charging with bakery mix, baking, and cooling to strengthen the baked goods prior to discharging.

14. The baking method comprised of applying a melted grease to the crust contacting surface of the utensil metal, removing the latent heat of fusion sufficiently to set the greasing film, charging with bakery mix, baking, and cooling to strengthen the baked goods prior to discharging.

15. The baking method comprised of applying a melted solid grease to the crust contacting surface of the utensil metal, removing the latent heat of fusion sufficiently to set the greasing film, charging with bakery mix, baking, and cooling to strengthen the baked goods prior to discharging.

16. The baking method comprised of applying a melted waxy solid grease to the crust contacting surface of the utensil metal, removing the latent heat of fusion sufficiently to set the greasing film, charging with bakery mix, baking, and cooling to strengthen the baked goods prior to discharging.

17. The baking method comprised of applying a grease and filler to the crust contacting surface of the utensil metal, removing the latent heat of fusion sufficiently to set the greasing film, charging with bakery mix, baking, and cooling to strengthen the baked goods prior to discharging.

18. The baking method comprised of applying a melted grease and filler to the crust contacting surface of the utensil metal, removing the latent heat of fusion sufficiently to set the greasing film, charging with bakery mix, baking, and cooling to strengthen the baked goods prior to discharging.

19. The baking method comprised of applying a melted solid grease and filler to the crust contacting surface of the utensil metal, removing the latent heat of fusion sufficiently to set the greasing film, charging with bakery mix, baking, and cooling to strengthen the baked goods prior to discharging.

20. The baking method comprised of applying a melted waxy solid grease and filler to the crust contacting surface of the utensil metal, removing the latent heat of fusion sufficiently to set the greasing film, charging with bakery mix, baking, and cooling to strengthen the baked goods prior to discharging.

21. The composition for greasing the crust contacting surface of a baking device characterized by setting up to the solid state at baking mix temperatures prior to oven charging and comprised of a low melting point pan oil as the solvent weakening component and of a similar solid solute as the film setting component.

22. The fatty solids composition for greasing the crust contacting surfaces of a baking device characterized by setting up to the solid state at baking mix temperatures prior to oven charging and comprised of a low melting point fatty oil as the solvent weakening component and of a solid fat as the film setting component.

IVA DE FREESE SAVAGE.